United States Patent [19]

Bermes

[11] Patent Number: 5,847,113
[45] Date of Patent: Dec. 8, 1998

[54] PREPARATION OF SULFO-CONTAINING COPPER PHTHALOCYANINE DYES

[75] Inventor: Rudolf Bermes, Ludwigshafen, Germany

[73] Assignee: BASF Aktiengesellschaft, Ludwigshafen, Germany

[21] Appl. No.: 942,393

[22] Filed: Oct. 10, 1997

[30] Foreign Application Priority Data

Oct. 31, 1996 [DE] Germany ......................... 196 45 105.1

[51] Int. Cl.⁶ ............................ C09B 47/20; C09B 47/24
[52] U.S. Cl. .............................. 540/139; 540/131; 8/402; 8/518; 8/661; 8/919
[58] Field of Search ...................................... 540/139, 131

[56] References Cited

U.S. PATENT DOCUMENTS

| 2,490,704 | 12/1949 | Paige ..................................... 260/314.5 |
| 4,198,203 | 4/1980 | Groll et al. ..................................... 8/7 |
| 4,560,745 | 12/1985 | Weberndoerfer et al. ............... 534/728 |
| 4,668,789 | 5/1987 | Bermes ....................................... 8/658 |

FOREIGN PATENT DOCUMENTS

| 0 041 134 | 12/1981 | European Pat. Off. . |
| 0 503 220 | 6/1982 | European Pat. Off. . |
| 0 145 003 | 6/1985 | European Pat. Off. . |
| 27 19 719 | 1/1978 | Germany . |
| 772800 | 4/1957 | United Kingdom . |

*Primary Examiner*—Mukund J. Shah
*Assistant Examiner*—Pavanaram K Sripada
*Attorney, Agent, or Firm*—Oblon, Spivak, McClelland, Maier & Neustadt, P.C.

[57] ABSTRACT

A process for preparing sulfo-containing copper phthalocyanine dyes having an absorption maximum $\lambda_{max.} \geqq 605$ nm comprises heating copper phthalocyanine with at least 15% strength oleum at about 50°–110° C. until the reaction product has a $\lambda_{max.} \geqq 605$ nm, then diluting the resulting sulfonation product with water, adding a tertiary, lipophilic amine and stirring at elevated temperature until the lipophilic phase comprising the ammonium salt separates from the aqueous sulfuric acid phase, subsequently admixing the lipophilic phase, optionally after washing with water, with a water-soluble base whose sulfonate salt is to be prepared and water, separating the resulting phases and leaving the salt in the aqueous solution or isolating it therefrom.

The products are especially useful for dyeing cellulosic fibers or polyamides.

6 Claims, No Drawings

PREPARATION OF SULFO-CONTAINING COPPER PHTHALOCYANINE DYES

DESCRIPTION

The present invention relates to a process for preparing sulfo-containing copper phthalocyanine dyes having an absorption maximum $\lambda_{max.} \geq 605$ nm.

Sulfonated naphthoquinophthalones having tri-2-ethylhexylamine as cation are known from EP-A-145 003. These salts are prepared by extraction of the sulfonic acids from the sulfonation mixture with the amines as per the process described in EP-A-53 220.

Sulfonated copper phthalocyanine dyes are known and commercially available as powders and liquids. They are customarily obtained by sulfonating copper phthalocyanine with oleum, the sulfonated dye being precipitated by addition of water, ice and salt, filtered off, washed and optionally converted into a liquid formulation. A representative example of this procedure is, for example, Example 1 of DE-B-27 19 719.

Disadvantages of this procedure are its prohibitive complexity, involving as it does precipitation, filtration and washing, and yield losses. Furthermore, inorganic salts cannot be removed quantitatively even by thorough washing.

It is an object of the present invention to provide a process which does not have these disadvantages.

We have found that this object is achieved by a process for preparing sulfo-containing copper phthalocyanic dyes having an absorption maximum $\lambda_{max.} \geq 605$ nm, which comprises heating copper phthalocyanine with at least 15% strength by weight oleum at about 50°–110° C. until the reaction product has a $\lambda_{max.} \geq 605$ nm, then diluting the resulting sulfonation product with water, adding a tertiary, lipophilic amine and stirring at elevated temperature until the lipophilic phase comprising the ammonium salt separates from the aqueous sulfuric acid phase, subsequently admixing the lipophilic phase, optionally after washing with water, with a water-soluble base whose sulfonate salt is to be prepared and water, separating the resulting phases and leaving the salt in the aqueous solution or isolating it therefrom.

The process of the invention has improved space-time yields, essentially due to nonisolation of the sulfonated product as a solid and the simplified handling of the liquid phases.

Furthermore, the yield of desired compounds is generally almost quantitative.

The sulfonation of the process of the present invention is advantageously effected using from 15 to 35% strength by weight, preferably from 20 to 30% strength by weight, oleum and temperatures from about 50° to 110° C., preferably from 60° to 100° C. It has been found that sulfonation products having absorption maxima from 605 to 625 nm (measured in dilute, aqueous solution) are particularly suitable for the subsequent reaction, and values of $\lambda_{max} \geq 610$ nm are preferred for liquid formulations.

It is customary to use from 3.5 to 7 times, preferably from 4 to 5 times, the amount of oleum per unit weight of copper phthalocyanine.

After sulfonation, the reaction mixture is poured into water which may already contain the tertiary, lipophilic amine or has said amine added to it subsequently. The amine is used in an equivalent amount advantageously in excess based on the number of sulfo groups in the copper phthalocyanine.

Examples of suitable tertiary lipophilic amines are those having $C_6$–$C_{12}$-alkyl chains, such as tri-n-octylamine, methyldioctylamine, methyldidecylamine, methyldodecylamine, tridodecylamine, isobutyl-di-2-ethylhexylamine, and especially tri-2-ethylhexylamine.

The mixture of sulfonated copper phthalocyanine, sulfuric acid, water and amine is stirred at elevated temperature, for example 90°–100° C., and then the stirring is switched off. After the phase separation which then takes place the aqueous sulfuric acid phase is discarded.

Water-soluble bases for transferring the sulfonic acid out of the organic phase back into the aqueous phase and, at the same time, into the desired water-soluble copper phthalocyanine salt are suitably, for example, alkali metal bases, ammonium hydroxide or hydrophilic amines.

If, in connection with the amines and their sulfonates, the text refers to a solubility or insolubility in water or to a lipophilicity which is sufficient for separation from the aqueous phase, this is always to be understood as meaning a solubility or insolubility or separability which is sufficient for the practical purposes of the invention. Losses or impurities of a few percent due to the absence of 100% insolubility may, depending on the circumstances, be acceptable or minimizable by replication of the separating step.

For conversion into pulverulent dyes, the lipophilic phase can be treated directly with aqueous alkali, preferably lithium hydroxide, potassium hydroxide, preferably sodium hydroxide, and the aqueous phase then separated off and dried to convert it into the pulverulent dye. The lipophilic amine is recovered after the dye solution has been removed.

The liquid formulation is advantageously prepared by washing the dye-comprising phase with hot water, a single wash being sufficient, in general.

The liquid formulation can then be obtained by treating the lipophilic phase with hydrophilic amines and water. The lipophilic amine is recovered and can be re-used. As a rule, an equivalent or larger amount of hydrophilic amine is used.

Hydrophilic amines which are particularly suitable for preparing the liquid formulations are alkanolamines such as monoethanolamine, diethanolamine, triethanolamine, mono- or di-$C_1$–$C_4$-alkylmonoethanolamines or -diethanolamines, the corresponding propanolamines or similar compounds.

The liquid formulations can be standardized to the desired color strength and pH as usual by addition of water and amine. The addition of solvents is likewise possible. Such solvents are for example glycols and ethers thereof, such as di- or triglycol, neopentylglycol, monopropylene, dipropylene or tripropylene glycol and also the $C_1$–$C_4$-alkyl monoethers of these compounds. Depending on the intended use, it is also possible to use N-methylpyrrolidone, caprolactam or urea.

The pulverulent and liquid formulations of the compounds prepared according to the invention are particularly useful for dyeing cellulosic fibers and polyamides, such as textiles and paper.

The copper phthalocyanine dye intermediates obtained with an absorption maximum $\lambda_{max} = \geq 605$ nm and a lipophilic amine as cation are easy to remove and subsequently to convert into the dye salt with the desired counter-ion. Of particular advantage are copper phthalocyanine dyes having an absorption maximum $\lambda_{max} = \geq 605$ nm and tri-2-ethylhexylamine as cation.

In the Examples which follow, parts and percentages are by weight, unless otherwise stated.

EXAMPLE 1

63.4 parts (0.11 mol) of copper phthalocyanine were introduced into 425.2 parts of oleum (24.8%) over two hours and heated to 60° C. After stirring at that temperature for thirty hours ($\lambda_{max.}$=607 nm), and cooling back down to 30° C., the batch was prediluted with 24 parts of water with cooling and stirred into 1650 parts of water. 266 parts of tri-2-ethylhexylamine were then added, the mixture was heated to 100° C. and the stirrer was switched off after an hour. A colorless aqueous phase separated off as bottom layer underneath the colored, liquid resin and was removed (1793 parts). Thereafter the dye-comprising phase was stirred with 444 parts of water and 79 parts of sodium hydroxide at 100° C. for thirty minutes to dissolve the dye in the aqueous phase. After allowing the mixture to stand for one hour, 824 parts of aqueous alkaline dye solution were removed as bottom layer, which evaporated to leave 211 parts of a pulverulent dye with $\lambda_{max.}$=607 nm. In addition, 261 parts of tri-2-ethylhexylamine were recovered.

EXAMPLE 2

63.4 parts of copper phthalocyanine were added to 425.2 parts of oleum (24.8%) over 75 minutes, heated to 80° C. over an hour and stirred at 80° C. for 15 hours. After this time $\lambda_{max.}$=621 nm. 24 parts of water were added with cooling, and the mixture was run into 1650 parts of water. 266 parts of tri-2-ethylhexylamine were then added, the mixture was heated to 100° C. and stirred at that temperature for 45 minutes. After the stirrer had been switched off, 1598 parts of an aqueous sulfuric acid solution were removed as bottom layer. After the batch had been stirred at 100° C. for an hour with a further 352 parts of water, a further 587 parts of acidic water were removed once more after allowing for phase separation. The remaining resinous material was heated with 180 parts of water, 45 parts of neopentylglycol and 88 parts of monoethanolamine to 100° C. and made to dissolve in the course of thirty minutes. Phase separation afforded, as bottom layer, 431 parts of an aqueous dye solution having a $\lambda_{max.}$ of 621 nm. 252 parts were recovered of the lipophilic amine.

EXAMPLE 3

57.6 parts of copper phthalocyanine were added to 235.4 parts of oleum (15.2%) over 80 minutes with stirring. The mixture was then heated to 100° C. over 60 minutes and stirred at that temperature for 8 hours until a $\lambda_{max.}$ of 613 nm was achieved. After cooling, the mixture was introduced into 865 parts of water, admixed with 245 parts of tri(2-ethylhexyl)amine and stirred at 100° C. for 30 minutes to form a liquid material. After allowing to stand for one hour, 804 parts of aqueous sulfuric acid were removed as bottom phase.

The colored resin was stirred up once more with 800 parts of water at 100° C. for half an hour. After the stirrer had been switched off, 963 parts of water comprising sulfuric acid were separated off.

The washed resin was dissolved at elevated temperature in 160 parts of water, 45 parts of triethanolamine and 39 parts of monoethanolamine. Of the resulting dye solution, which had a $\lambda_{max.}$ of 613 nm, 401 parts were removed as lower aqueous phase; 248 parts were recovered of a lipophilic phase consisting essentially of the water-insoluble amine.

EXAMPLE 4

191.7 parts of oleum (24%) and 38.3 parts of sulfuric acid were mixed. 57.6 parts of copper phthalocyanine were added over a period within the range from one to two hours with stirring and the mixture was heated to 100° C. over 60 minutes. After the batch had been stirred at 100° C. for four hours ($\lambda_{max.}$=617 nm), it was cooled down to 40°–35° C., mixed with 1000 parts of water, 242 parts of tri-2-ethylhexylamine, heated up again to 100° C. and stirred for one hour. It was then allowed to stand, and the hot dilute sulfuric acid which collected as bottom phase was removed (978 parts). The colored resin was washed once more with 1000 parts of water at 100° C. with stirring. 1154 parts of acidic wash liquor were obtained thereafter.

The remaining resin was dissolved at 100° C. in 270 parts of water, 27 parts of monoethanolamine and 45 parts of triethanolamine. Underneath the 236 parts of the lightweight organic phase, 497 parts of a concentrated solution of the dye separated off as bottom phase, the maximum absorption being at 617 nm.

EXAMPLE 5

57.6 parts of copper phthalocyanine were introduced into 230.4 parts of oleum (23.7%) over 50 minutes, heated to 100° C. and stirred at 100° C. for two hours until a $\lambda_{max.}$ of 616 nm. After cooling, the batch was mixed with 1000 parts of water, 242 parts of tri(2-ethylhexyl)amine, stirred at 100° C. for 40 minutes and was then allowed to cool down without stirring. Thereafter 1012 parts of aqueous sulfuric acid were removed as bottom phase. After renewed stirring of the resinous material with a further 1000 parts of water at 100° C. for 60 minutes, 1128 parts of sulfuric acid waste liquor were removed. The remaining resin was dissolved at 100° C. in 260 parts of water, 28 parts of 2,2-dimethylpropanediol, 45 parts of triethanolamine and 26 parts of monoethanolamine. After standing, 515 parts of a concentrated dye solution were removed as bottom phase; the dye has an absorption maximum at 616 nm. Left behind were 233 parts of an organic phase which consisted in the main of the lipophilic amine.

I claim:

1. A process for preparing sulfo-containing copper phthalocyanine dyes having an absorption maximum $\lambda_{max.} \geq 605$ nm, which comprises heating copper phthalocyanine with at least 15% strength by weight oleum at about 50°–110° C. until the reaction product has a $\lambda_{max.} \geq 605$ nm, then diluting the resulting sulfonation product with water, adding a tertiary, lipophilic amine and stirring at elevated temperature until the lipophilic phase comprising the ammonium salt separates from the aqueous sulfuric acid phase, subsequently admixing the lipophilic phase, optionally after washing with water, with a water-soluble base whose sulfonate salt is to be prepared and water, separating the resulting phases and leaving the salt in the aqueous solution or isolating it therefrom.

2. A process as claimed in claim 1, wherein the oleum used is from 20 to 30% strength by weight.

3. A process as claimed in claim 1, wherein the sulfonation is carried out at from 60° to 100° C.

4. A process as claimed in claim 1, wherein the sulfo-containing copper phthalocyanine dyes prepared have absorption maxima from 605 to 625 nm.

5. A process as claimed in claim 1, wherein the lipophilic amine used is tri-2-ethylhexylamine.

6. Sulfo-containing copper phthalocyanine dyes having absorption maxima $\lambda_{max} \geq 605$ nm with tri-2-ethylhexylamine as cation.

* * * * *